Patented Sept. 7, 1937

2,092,621

UNITED STATES PATENT OFFICE 2,092,621

RECOVERY OF BERYLLIUM FROM SILICEOUS ORES

Bengt R. F. Kjellgren and Charles B. Sawyer, Cleveland, Ohio, assignors to The Brush Beryllium Company, Cleveland, Ohio, a corporation of Ohio No Drawing. Application December 10, 1932, Serial No. 646,705. Renewed August 25, 1936

5 Claims. (Cl. 23—16)

The invention relates to improved methods of treating beryllium ores for the recovery of the beryllium content and other valuable constituents.

Beryllium ores are commonly more or less highly siliceous. Thus beryl, an imporant beryllium ore, typically contains about 12% beryllium oxide, 18% aluminum oxide, 1% iron oxide and alkalies and the balance, of about 68%, is silica. In the treatment of beryl, or other beryllium ore containing considerable amounts of silica, to recover the beryllium content, one of the important features of the treatment is the elimination of the relatively large amount of silica. This is true of any of the known or proposed methods of treating the siliceous beryllium ores. Thus, to mention a few typical methods of treatment, it is true of the treatment of beryl with acids to recover the beryllium content, as in the case of the method set forth in our United States Patent No. 1,823,864 in which we have described both a method for rendering beryl susceptible to the action of reagents and a method for treating solutions containing beryllium sulfate, aluminum sulfate and iron sulfate to produce pure beryllium sulfate, the beryl in this instance being treated with sulphuric acid. It is also true of methods in which the ore is treated with hydrochloric acid, as set forth in our same patent. The same thing is true also of methods in which the beryllium ore is treated with caustic sodium compounds.

It is apparent that a method adapted at low cost to eliminate the silica of such siliceous beryllium ores and still leave the residue in a form subject to chemical extraction, would be highly advantageous in the working of processes for the extraction of beryllium; and it is the chief object of the present invention to provide such a method of eliminating the silica.

A further, ancillary, object of the invention is the provision of a method of treating siliceous beryllium ores in which the silicon content of the ore is recovered in the form of a commercially valuable product which can be sold to offset the cost of the treatment.

With these and other ancillary or incidental objects in view our invention consists essentially in mixing with a siliceous beryllium ore suitable amounts of some form of carbon and some form of iron, such as iron oxide, and heating the mixture to more or less completely reduce the silica of the ore and form ferro-silicon and a slag containing the beryllium content of the ore as well as any unreduced silica, the ferro-silicon being heavier than the slag so that the two can readily be separated from each other. The ferro-silicon thus produced has a very considerable commercial value and the slag produced may be subjected to chemical extraction for the recovery of the beryllium and other valuable constituents of the ore.

In treating beryl, or other siliceous ores of beryllium, by our process it is important to have the composition of the slag produced in the formation of the ferro-silicon such that it can be melted and easily handled in the electric furnace. 2100° C. is about the highest temperature which can, with facilities now available, be employed easily in practice for making ferro-silicon. Beryl of typical composition contains beryllium oxide and aluminum oxide in the ratio of about 1 to 1.5; and we have found that a mixture of 40% beryllium oxide and 60% aluminum oxide does not melt readily at such a temperature. Accordingly, in treating beryl by our improved process we provide that the slag formed in conjunction with the production of ferro-silicon shall contain a suitable amount of some component so that its melting point will be lowered and the tapping of the material from the furnace facilitated. This can be accomplished advantageously in either of two ways, namely, first, by incompletely reducing the silica of the ore in forming the ferro-silicon, in which event the unreduced silica will form a constituent of the slag and give it a lower melting point, or, second, if the silica be completely reduced in the formation of the ferro-silicon some suitable substance can be added to the slag to effect the requisite lowering of its melting point.

To determine the amount of silica needed in the slag to render it easily fusible we have tested mixtures containing beryllium and aluminum oxides in the ratio of 1 to 1.5 and different amounts of silica. Such a mixture containing as little as 19% of silica gave an easily fusible melt. This mixture has only about 11% of the silica originally present in beryl and it can be decomposed with sulphuric acid, as described in our Patent No. 1,823,864. A mixture of similar sort but containing 36% silica was very easily decomposed in sulphuric acid, giving a yield of 91½% of the beryllium oxide by the method of separation described in said patent. In this latter mixture the silica present corresponds to 25% of the silica originally in the beryl. These tests indicate that in working our process satisfactory results can be secured by leaving from 19% to 36% of unreduced silica in the slag and doubtless a still larger proportion or a smaller proportion of silica may be left in the slag with satisfactory results insofar as the recovery of the beryllium content of the ore is concerned.

In carrying out our process, after formation of the ferro-silicon the latter sinks to the bottom of the melt so that it and the slag can be tapped off separately, whereupon the molten slag can be treated in accordance with the process set forth in our above mentioned Patent No. 1,823,864, in order to recover the beryllium content of the slag. That is to say, the molten slag is treated in the same manner as described in the patent for the treatment of the molten beryl, it being preferably quenched from its molten state by pouring into water, then comminuted, then treated with sulphuric acid and the resulting solution further treated in accordance with the description in the patent to recover the beryllium.

Of the two methods of rendering the slag readily fusible, we prefer that of leaving some of the silica of the ore in the slag if the latter is to be subjected to the acid treatment in accordance with the process of our Patent No. 1,823,864.

On the other hand, if the slag is to be subjected to an alkaline process for recovery of the beryllium content, we may prefer to effect the desired lowering of the melting point of the slag by adding to the ore-carbon-iron mixture a small amount of calcium oxide or barium oxide or equivalent material which enters the slag during the heating of the mixture and effects the desired lowering of the melting point of the slag. While the addition of a basic substance, for the basic process, seems preferable, it is pointed out that the basic process can still be operated with $SiO_2$ present in the slag. The calcium or barium oxide may conveniently be added in the form of calcium or barium carbonate. Thus, if there is added to a slag consisting of one part of beryllium oxide to 1.5 parts of aluminum oxide, about 1.1 parts of calcium carbonate, such addition will render the slag easily fusible at 2100° C. without any silica being present.

A suitable alkaline procedure for the recovery of the beryllium content from such a slag is to treat the slag with a hot caustic solution of sodium hydroxide or to sinter it with sodium carbonate. On extracting the slag, or the product formed by sintering the slag with sodium carbonate, with the hot alkaline solution, the aluminum and beryllium will pass into solution, leaving iron and calcium, and some silica combined with aluminum or beryllium, to be filtered off. The clear solution can then be treated with excess carbon dioxide so that aluminum hydroxide is precipitated; the beryllium hydroxide remaining in solution in sodium hydrogen carbonate. This separation of aluminum and beryllium may be carried out in a pressure autoclave in a manner analogous to the well known purification of aluminum ores by the Bayer process. Beryllium basic carbonate may then be precipitated by boiling the sodium hydrogen carbonate solution, which then evolves carbonic acid which may be reused in the process. When the beryllium basic carbonate is filtered from the solution the latter can be evaporated to produce sodium carbonate, or caustic soda may be regenerated by the addition of calcium oxide.

It will be understood that the essential features of our improved process can be carried out in a variety of ways and that the invention is not limited to the specific procedures which have been described, the scope of the invention being indicated by the appended claims.

What we claim is:

1. The process of treating siliceous beryllium ores which comprises mixing carbon and iron with the ore; heating the mixture to form an iron-silicon alloy and a slag containing the beryllium of the ore and less silica than the original ore; separating the iron-silicon alloy from the slag; and treating the slag with mineral acid to decompose constituents of the slag and recover the beryllium.

2. The process of treating siliceous beryllium ores which comprises mixing carbon and iron with the ore; heating the mixture to form an iron-silicon alloy and a slag containing the beryllium of the ore together with silica in substantial amount but less than in the original ore; separating the ferro silicon from the slag; and treating the slag with mineral acid to decompose constitutents of the slag and recover the beryllium.

3. The process of treating siliceous beryllium ores which comprises heating the ore with carbon, iron and a material containing a basic element to form an iron-silicon alloy and a slag containing the beryllium of the ore and very little silica; and treating the slag in a basic solution to decompose constituents of the slag and recover the beryllium.

4. The process of treating siliceous beryllium ores which comprises heating the ore with carbon and iron to form an iron-silicon alloy and a slag containing the beryllium of the ore and being easily fusible at 2100° C.

5. The process of treating siliceous beryllium ores which comprises heating the ore with carbon, iron and a third difficultly reducible fluxing material to form an iron-silicon alloy and a slag containing the beryllium of the ore and very little silica and being easily fusible at 2100° C.

BENGT R. F. KJELLGREN.
CHARLES B. SAWYER.

CERTIFICATE OF CORRECTION.

Patent No. 2,092,621.  September 7, 1937.

BENGT R. F. KJELLGREN, ET AL.

It is hereby certified that error appears in the printed specification of the above numbered patent requiring correction as follows: Page 2, second column, line 34, claim 2, for "ferro silicon" read iron-silicon alloy; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.